Sept. 11, 1956  D. A. GULLAND  2,762,405
REMOVABLE CLAMP SHOE MOUNTED FOR UNIVERSAL MOVEMENT
Filed June 23, 1953

INVENTOR.
DONALD A. GULLAND
BY
Gregory S. Dolgorukof
ATTORNEY.

United States Patent Office 2,762,405
Patented Sept. 11, 1956

2,762,405

REMOVABLE CLAMP SHOE MOUNTED FOR UNIVERSAL MOVEMENT

Donald A. Gulland, Detroit, Mich.

Application June 23, 1953, Serial No. 363,592

3 Claims. (Cl. 144—304)

This invention relates to universal pressure shoes and similar devices which may be used as the work-contacting elements on screws or clamps, jigs and fixtures or similar devices for exerting pressure on surfaces which are not perpendicular to the direction of the pressure but form various other angles therewith and, therefore, require elements which could adjust themselves to such surfaces.

The present application is a continuation-in-part of my co-pending application, Serial No. 3,320, filed on January 20, 1948 for Removable Clamp Shoe with Tiltable Work-Engaging Element, which matured into Patent No. 2,649,123.

It has been well appreciated in the tool industry, particularly in designing various jigs and fixtures adapted to receive and hold various work pieces including slanted or curved surfaces, that special means have to be provided if holding of a work piece in a jig or fixture is to be done reliably and safely at such slanted surface. For a great number of years such means were almost exclusively in the form of specially designed and specially made ends of pressure screws, i. e., screws adapted to exert pressure on work pieces. In spite of the great variety of forms of such means, all of them had common features possessing various serious disadvantages, particularly the necessity of modifying the end of a pressure screw as well as designing and making of a member to be retained on such a screw. Modifying the ends of the pressure screws in the above described manner is an operation of a substantial nature requiring proper designing and special shop equipment. Moreover, such modifications are irreparable, i. e., they modify the end of the pressure screw permanently making it impossible to reconvert the screw to its original shape and size.

One of the objects of the present invention is to provide a pressure shoe which does not require for its assembly to a fixture or a clamp, or making any irreparable modifications at the end of the screws or of other parts of the device or equipment wherein it may be used.

Another object of the present invention is to provide a pressure shoe which may be assembled to a pressure screw of a fixture or jig or a clamp, table legs, legs of vending machines and similar devices, in the field and without sending the same or some parts thereof to the shop for modification.

A further object of the present invention is to provide an improved pressure shoe which may be assembled to the pressure screw merely by being put thereon by hand and tightened with a common wrench, and taken off, if desired, in a similarly simple manner.

A still further object of the present invention is to provide an improved pressure shoe of such a nature that pressure shoes from discarded fixtures can be salvaged and used in other fixtures.

A still further object of the present invention is to provide an improved pressure shoe having a hole receiving the end of the screw and internally threaded with screw threads of a certain standard screw thread size, thus making such shoe a standard item, a supply of which, in a variety of standard sizes, may be kept on hand in a shop for use as occasion arises.

A further object of the present invention is to provide an improved pressure shoe of the foregoing nature, a substantial number of the parts of which is manufactured by stamping operations, with other portions being manufactured on automatic screw machines, thus making the entire device susceptible of low cost quantity production.

A still further object of the present invention is to provide an improved pressure shoe having such a construction that manufacturing thereof requires machining which is light and easy and which does not require use of bottoming taps.

A still further object of the present invention is to provide an improved method of manufacturing the pressure shoe of the nature specified above.

Further objects and advantages of this invention will be apparent from the following description and appended claims, reference being had to the accompanying drawings forming a part of this specification, wherein like reference characters designate corresponding parts in the several views.

Figure 1:
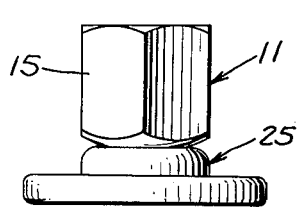
Fig. 1 is an elevational view of a universal pressure shoe embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

Figs. 1–4, inclusive, illustrate one embodiment of this invention. Here a universal pressure shoe is shown as comprising a pressure screw-engaging member or nut 11, having a cylindrical hole or recess 12 extending from the top of the member 11 part way through the same. A cylindrical hole 13 of smaller diameter than the recess 12 extends from the bottom of the member, and both recesses are joined by a cylindrical passage 14 of smaller diameter than the recess 12 but of larger diameter than the hole 13. By virtue of such an expedient shoulders 21 and 22 are formed within the nut member 11.

The member 11 is provided with wrench flats 15 which may be engaged by a conventional wrench. The recess 12 in member 11 is provided with internal screw threads of a standard size. In this manner the member may be threadedly attached to a pressure screw 16 of a clamp or fixture 17. The clamp and pressure screw may be of any conventional type.

Fitted in the hole 13 is the shank 18 of a rivet having a head 19 located in and filling the opening 14. The opposite end of the rivet is provided with a part-spherical head 20 for reasons explained hereafter.

The nut member 11 may be easily made on a standard automatic screw machine and since its shape is simple, its manufacturing costs are extremely low.

Figure 2:
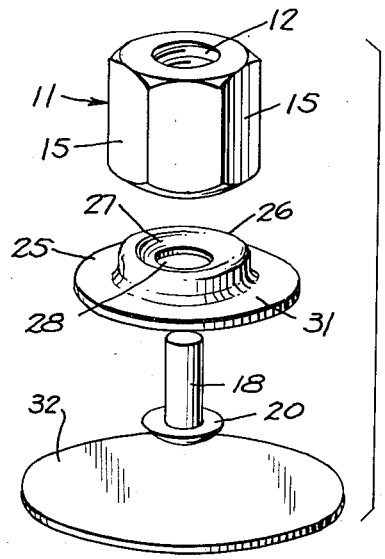
Fig. 2 is an exploded view showing the component parts of the shoe of Fig. 1, in perspective.
Figure 3:
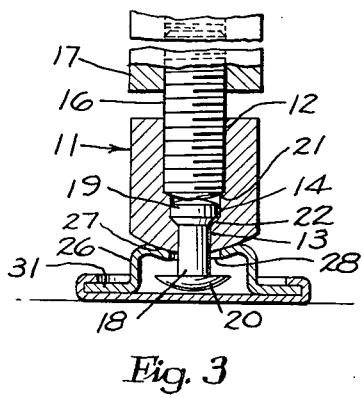
Fig. 3 is a longitudinal cross-sectional view of the pressure shoe of Fig. 1, the same being illustrated assembled to a pressure screw.

A stamped cup shaped member 25 (see exploded view of Fig. 2) having a raised center portion 26, is provided with concaved portion 27 which is complementary to the spherical surface 20 of the member 11. As best seen in Fig. 2, a hole 28 is punched or drilled through the center of the cup. Through this hole is passed the shank 18 of the rivet so that the spherical head of the rivet lies within the raised center portion 26. As seen, the hole 28 is of greater diameter than the rivet shank so that the cup member may move relative to the nut member 11.

The cup member is provided with an outwardly extending flange 31 to provide for an increased area of contact with a work surface. A sheet metal disc 32 serves as a bottom for the cup shaped member. The edges of this disc 32 are rolled over the flange 31.

The raised portion of the cup member is so proportioned that a slight clearance is provided between the spherical rivet head and the bottom disc 32.

In assembling the complete universal pressure shoe of this invention, the rivet shank is passed, before its end is formed or upset, through the hole in the cup shaped member. Then the bottom disc is applied and its edges are rolled over the edges of the flanges of the cup shaped member. Following this, the rivet shank 18 is inserted into the hole 13 of the pressure screw engaging member 11, and the end of the rivet is upset to form a head 19 filling the opening 14.

Figure 4:
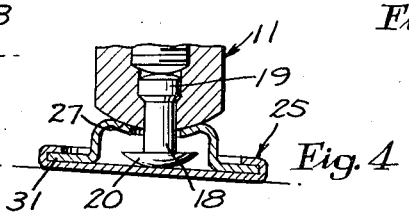
Fig. 4 is a fragmentary view similar in part to Fig. 3 but showing the parts of the pressure shoe in operative positions under the condition of axial misalignment of said parts.
Figure 5:
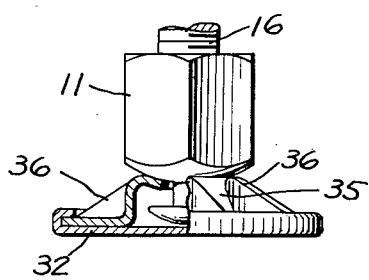
Fig. 5 is an elevational view, partly in section, showing a modified construction of my improved pressure shoe.

In the modification illustrated in Fig. 5, the pressure shoe is provided with a pressure screw engaging member 11 which is identical to that shown in Figs. 1–4. Likewise, an identical rivet is provided. However, in this modification the cup shaped member 35 has reinforcing ribs 36 formed thereon by stamping or other operations. A sheet metal disc 32 is provided as a bottom for the cup shaped member and has its edges rolled on the cup shaped member flanges in the same manner as in Figs. 1 to 4.

Figure 6:
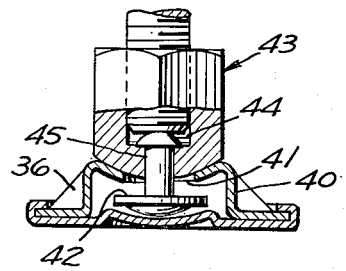
Fig. 6 is a view similar in part to Fig. 5 and showing a still further modification.

In the embodiment illustrated in Fig. 6, the cup shaped member 40 and the rivet are the same as that shown in Fig. 5. However, the hole 41 in the cup shaped member is made larger and a washer 42 is provided on the rivet to prevent its part-spherical head from slipping through said hole. In this manner a greater degree of relative movement between the pressure screw-engaging member 43 and the cooperating cup portion is permitted. The bottom disc may be embossed as illustrated to prevent excessive clearance between the rivet head and the disc under conditions of particularly large axial misalignment.

Further, in this embodiment, the pressure screw-engaging member is provided with an internally threaded cylindrical recess 44, which connects directly with a cylindrical hole 45 through which the rivet shank is passed. Thus, the difference between the member 43 of this embodiment and the member 11 of the embodiments of Figs. 1–4, is that the connecting or intermediate recess has been omitted.

In operation, using the embodiment of Figs. 1–4, for example, the pressure screw-engaging member is threaded on a pressure screw of a clamp, jig, etc., by hand. Then the member is tightened by means of an ordinary wrench engaging the wrench flats of the member. The end of the pressure screw bears down upon and presses against the rivet head (see 9 in Fig. 3, for example).

The bottom of the cup-shaped member, i. e., the disc 32, is then brought up against the surface of the work piece. Where the surface of the work piece is curved or slanted, the bottom disc with its attached cup shaped member will swivel so that maximum surface contact may be made between the bottom disc and work piece surface. In Fig. 4, an example of the bottom disc engaging a slanted surface is illustrated.

As the pressure screw is tightened, pressure exerted thereby on the head 19 of the rivet is transmitted through the pressure screw engaging member by means of the rivet head abutting the inside shoulder of said member (see Fig. 4 and Fig. 6, for examples). The force of the member against the cup causes the cup to deform slightly. Next, the part-spherical head of the rivet will engage the bottom disc, and the disc in turn will apply pressure to the work piece. Thus, when the rivet head contacts the bottom disc, the pressure from the screw will be applied directly through the rivet. Since the cup is made of sheet metal which has a certain degree of resiliency, the cup will recover its shape when the pressure is removed.

The operation of the embodiments of Figs. 5 and 6 are the same as set forth above. However, in these embodiments the reinforcing ribs prevent excess deformation of the cups and serve to strengthen the cupped shaped member. In the embodiment of Fig. 6, the enlarged hole in the cup allows for greater swiveling movement between the cooperating cup and spherical surface of the pressure screw engaging member.

The pressure shoe of this invention may be made in any standard size. Therefore, each shoe may be readily attached to any corresponding standard size pressure screw and used for as long as necessary. Thereafter, the pressure shoe may be taken off from the screw, and be ready for use with the screw of a different jig or clamp. The screw itself requires no permanent modification and, in fact, no modifications whatsoever. Therefore, the screw may be used with or without the pressure shoe as the occasion demands.

The pressure shoe of this invention is inexpensive to manufacture and may be sold in sets of certain standard sizes which may then be stocked in the shop for use as needed.

It will be understood that the direction of curvature of the part-spherical portions on the nut member and the cup member may be reversed, i. e., made directed upwardly instead of downwardly as illustrated in the drawing.

By virtue of the above disclosed construction and method of making same, the objects of the present invention listed above, and numerous additional advantages are attained.

I claim:

1. As a separate article of manufacture, a universal shoe adapted to be detachably connected to a pressure screw, said shoe including a nut adapted to engage the pressure screw at one of its ends and having its other end closed and formed to a part-spherical surface, a rivet having a shank secured in said closed end of the nut and protruding therefrom for a predetermined distance, a member of inverted cup shape having on its closed end a surface complementary to and engaging the part-spherical end of said nut, and a hole for passage of the rivet shank with clearance, a part-spherical head on the protruding end of said rivet shank to retain said cup-shaped member, and outwardly flared out lower edges on said cup-shaped member extending downwardly at least to the downward extent of the rivet head.

2. As a separate article of manufacture, a universal shoe adapted to be detachably connected to devices including pressure screws, said shoe including a pressure screw engaging member comprising a body having one end with a cylindrical recess provided therein and threaded to engage a pressure screw, said recess having a bottom with a through hole therethrough, said body having a part sphere provided on its other end, a rivet having a shank fixed in said hole and protruding outwardly therefrom beyond said part-spherical end of the body, and a part-spherical head on said shank; an inverted cup shaped member having its closed end shaped to have a surface complementary to the part-spherical end of said body and slidably engaging the same and having a hole for passage of said rivet shank with clearance, the open end of said cup shaped member extending slightly beyond the part-spherical head of the rivet, and a bottom member adapted to close the lower end of said cup-shaped member to retain the assembly and to provide a supporting surface.

3. The invention defined in claim 2, said cup-shaped member being resiliently deflectable under load to have the head of the rivet contact the bottom member to transmit part of the load thereto.

References Cited in the file of this patent

UNITED STATES PATENTS

| | | |
|---|---|---|
| 342,850 | Smith | June 1, 1886 |
| 1,412,961 | Periolat | Apr. 18, 1922 |
| 2,228,593 | Dibble et al. | Jan. 14, 1941 |
| 2,432,352 | Strotz | Dec. 9, 1947 |
| 2,579,995 | Atchison | Dec. 25, 1951 |
| 2,649,123 | Gulland | Aug. 18, 1953 |

FOREIGN PATENTS

| | | |
|---|---|---|
| 246,334 | Switzerland | Sept. 1, 1947 |